US010602728B2

(12) United States Patent
Coxey

(10) Patent No.: US 10,602,728 B2
(45) Date of Patent: Mar. 31, 2020

(54) DIAMONDBACK RATTLER FISHING TACKLE

(71) Applicant: Robert Coxey, Jacksonville, FL (US)

(72) Inventor: Robert Coxey, Jacksonville, FL (US)

( * ) Notice: Subject to any disclaimer, the term of this patent is extended or adjusted under 35 U.S.C. 154(b) by 0 days.

(21) Appl. No.: 16/545,857

(22) Filed: Aug. 20, 2019

(65) Prior Publication Data

US 2019/0364863 A1    Dec. 5, 2019

Related U.S. Application Data

(63) Continuation-in-part of application No. 16/433,723, filed on Jun. 6, 2019, now Pat. No. 10,426,149, which is a continuation of application No. 16/156,823, filed on Oct. 10, 2018, now Pat. No. 10,357,025.

(60) Provisional application No. 62/570,513, filed on Oct. 10, 2017, provisional application No. 62/681,147, filed on Jun. 6, 2018, provisional application No. 62/681,180, filed on Jun. 6, 2018.

(51) Int. Cl.
*A01K 85/01* (2006.01)
*A01K 95/02* (2006.01)
*A01K 85/10* (2006.01)

(52) U.S. Cl.
CPC .............. *A01K 85/01* (2013.01); *A01K 85/10* (2013.01); *A01K 95/02* (2013.01)

(58) Field of Classification Search
CPC ................................ A01K 85/01; A01K 85/10
USPC ......................................................... 43/42.5
See application file for complete search history.

(56) References Cited

U.S. PATENT DOCUMENTS

| | | | |
|---|---|---|---|
| 1,600,618 A | 9/1926 | Bentley | |
| 1,636,904 A | 7/1927 | Elwood | |
| 1,698,193 A | 1/1929 | Geer | |
| 1,867,555 A | 7/1932 | Hildebrandt | |
| 2,131,858 A | 10/1938 | Ledrich | |
| 2,212,294 A | 8/1940 | Larzelere | |
| 2,674,823 A | 4/1954 | Gellings | |
| 2,823,484 A | 2/1958 | Maurice | |
| 3,935,660 A | 2/1976 | Plew | |
| 4,730,410 A | 3/1988 | Sobieniak | |
| 4,791,750 A * | 12/1988 | Gammill | A01K 85/01 43/42.31 |
| 4,888,909 A | 12/1989 | Adams | |
| 5,001,856 A | 3/1991 | Gentry | |
| 5,113,606 A | 5/1992 | Rinker | |
| 5,121,568 A * | 6/1992 | Lindmeyer | A01K 85/01 43/42.31 |
| D372,954 S * | 8/1996 | Coniglio | D22/126 |
| 5,605,004 A | 2/1997 | Boullt et al. | |
| 5,647,163 A | 7/1997 | Gorney | |
| 5,887,379 A | 3/1999 | Lockhart | |
| 6,158,162 A | 12/2000 | Loniello | |
| 6,173,521 B1 * | 1/2001 | Rockhill, Jr. | A01K 85/00 43/42.13 |

(Continued)

*Primary Examiner* — Christopher P Ellis
(74) *Attorney, Agent, or Firm* — Joseph P. Kincart

(57) ABSTRACT

An apparatus and methods relating to Diamondback Rattler tackle, a new type of lure that includes an audible generator (such as a rattle) attached to a bent blade. The audible generator has some freedom of movement relative to the blade, allowing various noise profiles to be produced depending upon the type of audible generator chosen and the degree of bend in the blade. The blade may also have various holes to secure it to a wire and to change its hydrodynamic profile.

20 Claims, 19 Drawing Sheets

(56) References Cited

U.S. PATENT DOCUMENTS

| | | | | |
|---|---|---|---|---|
| 6,182,390 | B1 * | 2/2001 | Watkins | A01K 85/08 43/42.11 |
| 6,601,336 | B1 * | 8/2003 | Link | A01K 85/00 43/42.11 |
| 7,467,491 | B1 | 12/2008 | Slocum | |
| 7,614,178 | B2 * | 11/2009 | Hoyt | A01K 85/01 43/42.31 |
| 8,042,298 | B1 | 10/2011 | Yonekura et al. | |
| 8,601,737 | B2 * | 12/2013 | Beer | A01K 85/10 43/42.31 |
| 8,910,415 | B2 * | 12/2014 | Farr, Jr. | A01K 85/01 43/42.06 |
| 9,032,660 | B2 | 5/2015 | Vanacore | |
| 10,123,520 | B2 * | 11/2018 | Furuya | A01K 83/00 |
| 10,136,623 | B2 * | 11/2018 | Crain | A01K 85/01 |
| 10,244,741 | B1 * | 4/2019 | Hancock | A01K 85/16 |
| 2002/0148155 | A1 | 10/2002 | Pasley | |
| 2003/0145510 | A1 | 8/2003 | Kohigashi et al. | |
| 2004/0079022 | A1 | 4/2004 | Owen et al. | |
| 2006/0000138 | A1 | 1/2006 | Druk | |
| 2006/0242887 | A1 | 11/2006 | Toman | |
| 2009/0211144 | A1 | 8/2009 | Murphy | |
| 2010/0263258 | A1 | 10/2010 | Hinz | |
| 2010/0281756 | A1 | 11/2010 | Lau | |
| 2011/0119985 | A1 | 5/2011 | Siler | |
| 2011/0247260 | A1 | 10/2011 | Schwartz | |
| 2014/0059916 | A1 | 3/2014 | Culver et al. | |
| 2014/0150329 | A1 | 6/2014 | Waldroup | |
| 2017/0347635 | A1 | 12/2017 | Sandefur | |
| 2018/0310538 | A1 * | 11/2018 | Supinski | A01K 85/14 |
| 2019/0216067 | A1 | 7/2019 | Naig | |

\* cited by examiner

501 Fixedly attach an audible noise generator to a slide using thermoplastic tubing

502 Thread a wire through the slide

503 Movably attach the wire to a blade

504 Bend the blade according to a desired parameter

505 Movably attach a hook (optionally, a weighted hook) to the blade

FIG. 5

800 — POSITION A HOOK ON A LURE SPOON WITH A HOLE AT A PROXIMATE END, A HOLE A DISTAL END, AND A HOLE AT A MID-PORTION OF THE SPOON

801 — FIXEDLY ATTACH THE HOOK TO THE HOLE AT THE MIDPORTION OF THE LURE SPOON

802 — ATTACH A PROXIMATE END OF A SWIVEL TO THE HOLE AT THE DISTAL END OF THE SPOON

803 — FIXEDLY ATTACH A RATTLE ASSEMBLY TO A PORTION OF THE SHANK OF THE HOOK PROXIMATE TO THE HOLE AT MIDPORTION VIA SHRINK TUBING

804 — FIXEDLY ATTACH THE SHANK OF THE HOOK TO THE SWIVEL VIA SHRINK TUBING

805 — ATTACH A BLADE TO A DISTAL END OF THE SWIVEL

FIG. 8

DIAMONDBACK RATTLER FISHING TACKLE

CROSS-REFERENCE TO RELATED APPLICATION

The present application is a continuation in part to application Ser. No. 16/433,723, filed on Jun. 6, 2019 and entitled "Methods and Apparatus for Enhanced Audible Fishing Equipment with Heat Shrink", which in turn is a continuation in part to application Ser. No. 16/156,823, filed on Oct. 10, 2018 and entitled "Spinning Fishing Lure with Bead Elements with Auditory Attractant Characteristics", which in turn claims priority to U.S. Provisional application 62/570,513, filed on Oct. 10, 2017 entitled "Spinning Fishing Lure with Bead Elements with Auditory Attractant Characteristics". The present application also claims priority to U.S. Provisional App. Nos. 62/681,147 (filed on Jun. 6, 2018, and entitled Audible Enhanced Fishing Lure) and 62/681,180 (filed on Jun. 6, 2019, and entitled Methods and Apparatus for a Weighted Popping Flotation Device with Audible Attraction). The contents of each of the above referenced applications are expressly incorporated herein by reference and relied upon.

FIELD OF THE DISCLOSURE

The present disclosure relates to apparatus for tackle, including fishing lures and a method for making same.

BACKGROUND OF THE DISCLOSURE

Fishing is an activity enjoyed by many people around the world and can provide both food and sporting entertainment. Basic fishing equipment includes a fishing rod and reel that extends a fishing line to a hook. To increase the odds of catching a fish, various attractions may be placed on, adjacent to, or through the hook, such as bait, jigs, and lures. An ability to configure a fishing lure to attract fish to a hook without bait can provide an economical and easy solution when preparing to go fishing. While certain lures can work better at different locations or different times (or for different fish), there are advantageous aspects among many lures, generally these aspects include ways to entice a fish to strike the lure.

As fishing experts increase their understanding of which aspects are most effective at causing a fish to strike a lure, they are able to incorporate these aspects into devices used as fishing tackle.

SUMMARY OF THE DISCLOSURE

Accordingly, the present invention provides Diamondback Rattler fishing tackle in the form of lures generally including an audible generator, a formed blade with a convex area, a concave area and at least one apex, as well as a lift portion formed to be generally perpendicular to movement of fluid relative to the blade as the blade follows a path through water. One or more hooks, and in some embodiments at least one weighted hook are attached to the blade. The audible generator is in mechanical communication with the blade and a vibration emanates from the audible generator based at least upon movement of the blade.

Varying angles and depths of bends included in the formed blade produce different audible emanations, vibration and reflection patterns. An amount of audible emanations, vibration and reflection patterns may be selected based upon a type of marine environment, the type of marine life to be caught, weather conditions, water current, a speed of the Diamondback Rattler fishing tackle traversing through water, and other factors.

In some embodiments, the formed blade may have one or more holes therethrough. The holes may be positioned through the blade to contribute to one or more of: movement resulting from hydrodynamics, noise patterns, and lift of the blade.

BRIEF DESCRIPTION OF THE DRAWINGS

The accompanying drawings, which are incorporated in to and constitute a part of this specification, illustrate several embodiments of the disclosure. Together with the detailed description, the drawings serve to explain the principles of this disclosure.

FIG. 5 illustrates an exemplary method for assembling Diamondback Rattler tackle.

FIG. 8 illustrates exemplary steps that may be performed in making an Audible Enhanced Fishing Lure.

DETAILED DESCRIPTION

The present disclosure provides generally for Diamondback Rattler fishing tackle ("Diamondback Rattler"), which is a specialized, easy-to-assemble lure capable of generating desirable noise patterns and lift as the Diamondback Rattler fishing tackle is placed within a water current or traverses through the water. The noise patterns and lift characteristics of the Diamondback Rattler fishing tackle enhance the ability of the Diamondback Rattler to attract fish to the Diamondback Rattler.

Figure 1:
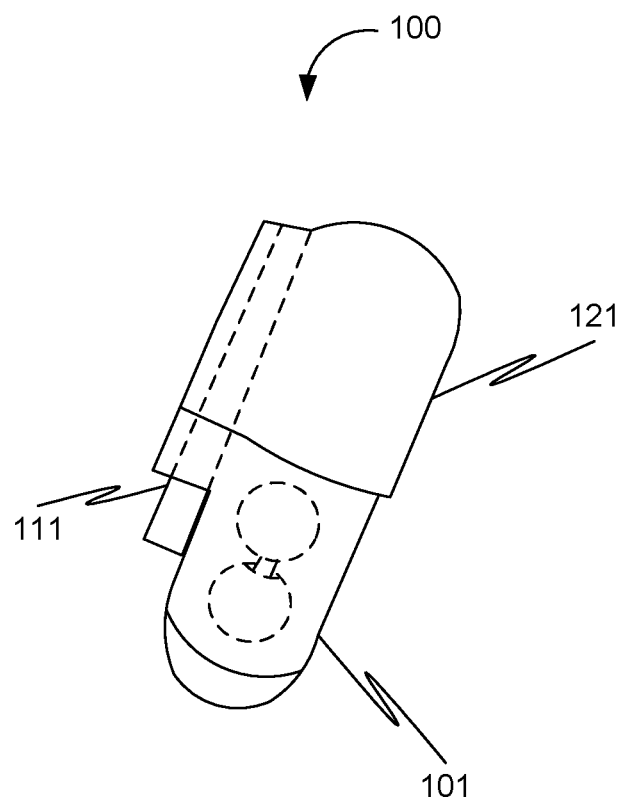
FIG. 1 illustrates an exemplary embodiment of an audible generator in accordance with the present invention.

In the following sections, detailed descriptions of examples and methods of the disclosure will be given. The description of both preferred and alternative examples of the invention are exemplary only; it is understood that variations, modifications, and alterations may be apparent. It is therefore to be understood that the examples do not limit the broadness of the aspects of the underlying disclosure as defined by the claims. As will be discussed further below, the order of presentation of various component of the present invention will follow an exemplary flow of an assembly method, Referring now to FIG. 1, the Diamondback Rattler 100 includes an audible generator 101, slide 102, and heat-shrink tubing 103. In some embodiments, the audible generator 101 includes a cylindrical casing and one or more strikers within the casing. The cylindrical casing is closed at both ends and encloses at least one striker comprising a moveable insert, such as a metallic or hard plastic ball bearing. At least one striker may be a ball, which is roughly spherical and has a diameter slightly smaller than a base diameter of an associated cylindrical casing. At least one striker can move freely within the casing to create a rattling sound when it impacts a closed end of the cylindrical casing or another striker, such as another metallic ball bearing.

The slide 102 comprises a hollow, roughly cylindrical tube that is open on both ends. In some exemplary embodiments, slide 102 includes an inner diameter of between approximately 0.06-0.30 inches. Essentially, an inner diameter of the slide 102 should be large enough to slide a wire therethrough, but small enough to introduce an acceptable amount of drag to the Diamondback Rattler 100 when deployed in a marine environment. In some embodiments, the slide 102 is metallic.

The heat-shrink tubing 103 is a shrinkable plastic (or thermoplastic) tube used to bind a plurality of distinct components together. Many varieties of heat-shrink tubing comprised of various compositions are available. A suitable material may be based upon a degree of ruggedness and a type of water the Diamondback Rattler tackle will be deployed in. In exemplary embodiments of the present invention, the heat-shrink tubing 103 comprises water-resistant polyvinylchloride (known in the art as PVC), with or without any additives such as adhesives, colorants, or stabilizers, though any other thermoplastic material suitable for underwater applications is also appropriate. Other materials may include, for example a polyolefin or acrylated olefin. In exemplary embodiments, the heat-shrink tubing 103 is roughly cylindrical, comprising an inner surface and an outer surface. Additionally, in some embodiments, the heat-shrink tubing 103 comprises a substrate of heat-activated adhesive along an inner surface of the heat-shrink tubing 103.

The heat shrink tubing has a first diameter in an expanded state at a first temperature. The first temperature may generally be an ambient room temperature but may include a temperature up to about ninety degrees Celsius (194 degrees Fahrenheit). The heat shrink tubing will have a second diameter that is smaller than the first diameter. The second diameter is brought about by exposing the heat shrink tubing to a temperature sufficient to cause the heat shrink tubing towards an unexpanded state. In general, the tubing must be heated to a temperature of about ninety degrees Celsius to cause the heat shrink tubing to shrink towards its unexpanded state.

In exemplary embodiments, the slide 102 and the audible generator 101 are positioned adjacent to each other such that, in embodiments in which the slide 102 and audible generator are approximately cylindrical, the respective radial axes of the slide 102 and audible generator 101 are approximately parallel. Once so positioned, the slide 102 and audible generator 101 are placed within the heat-shrink tubing 103, which is subsequently heated and cooled to mold to the slide 102 and audible generator 101, thereby fixing the slide 102 and audible generator 101 in their respective places. This fixing is enhanced in embodiments in which the heat-shrink tubing 103 comprises the aforementioned heat-activated adhesive along an inner surface of the heat-shrink tubing 103.

Figure 2:
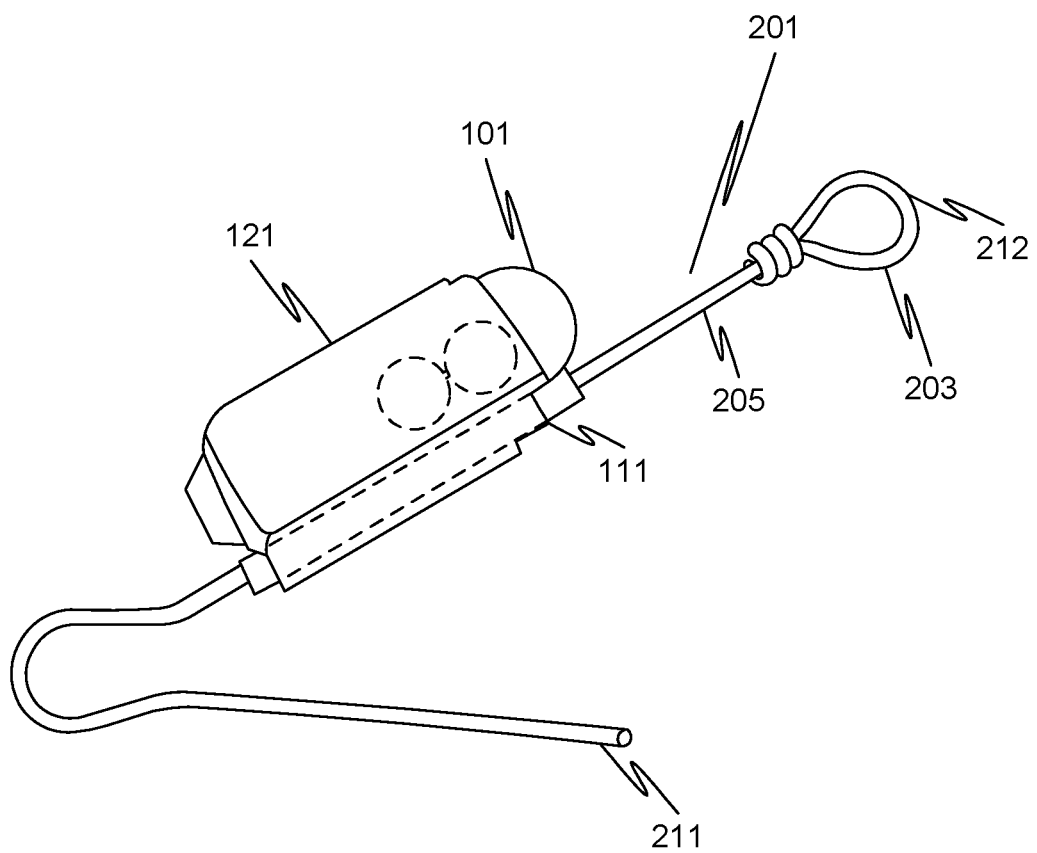
FIG. 2 illustrates an exemplary embodiment of an audible generator attached to a backbone wire, which is looped to form an eye.

Referring now to FIG. 2, after the slide 102 and audible generator 101 are molded or otherwise fixed together with the heat-shrink tubing 103, a wire 201 is passed through the inner diameter of the slide 102 (throughout the discussion, an exemplary order of assembly will be discussed, however, other orders of assembly are also within the scope of the invention, for example, in some embodiments, the wire 201 may be inserted through the slide 102 prior to fixing the slide to the audible generator). In exemplary embodiments, the wire 201 comprises a length of a metallic material. In some embodiments, an end of the wire 201 may be formed into an eye 212, through which a thin material may be passed, such as a fishing line. Forming of the eye 212 may be accomplished, for example, by looping an end portion 203 of the wire and twisting the end portion of the wire around a shaft 205 of the wire 201.

A second end of the wire 201 may be sufficiently long that, after being passed through the slide 102, the end may be bent to form an arcuate shape 206 that may be threaded through holes 311A 311B in a blade 331 (illustrated in FIG. 3). The slide 102 and attached audible generator 101 may move freely in either or both of: axially (e.g. up and down the length of wire 201) or rotatingly (e.g., audible generator 101 has nearly complete 360° movement with respect to the wire 201).

By virtue of heat-shrink tubing 103, a user can deploy the combined wire 201, slide 102, and audible generator 101 in a variety of aquatic environments, with or without associated blades, hooks or lures discussed herein. This may allow a user to take advantage of the freedom of movement of the audible generator 101 without fear that the audible generator 101 will detach from wire 201.

Figure 3A:
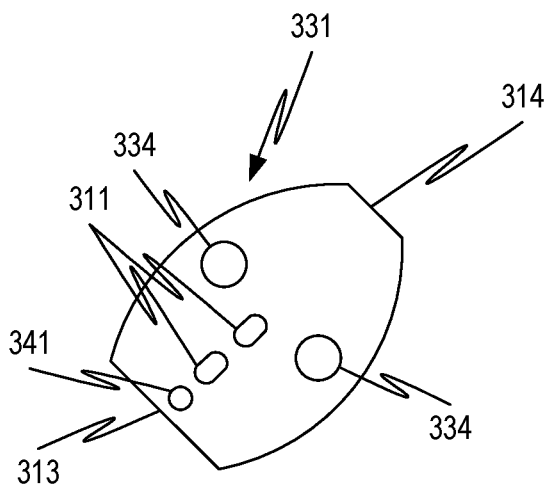
FIG. 3 illustrates a type of lure to which an audible generator and wire may be attached.
Figure 3C:
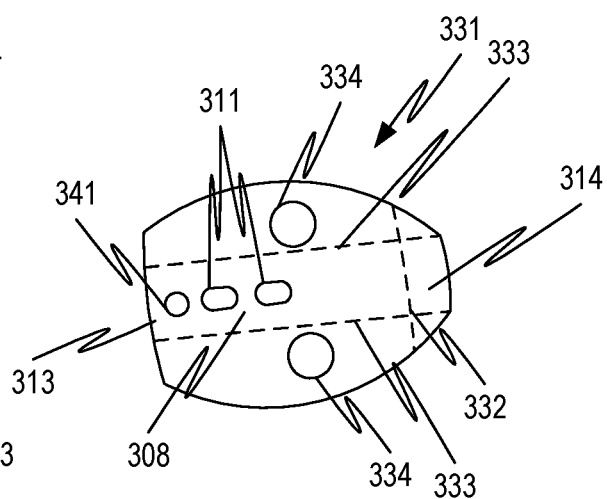
Figure 3B:
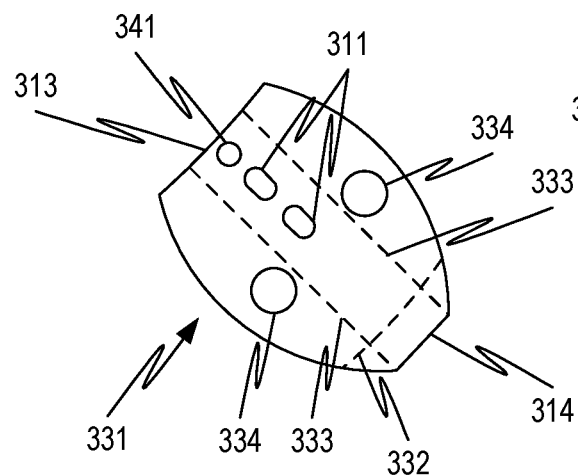

Referring now to FIGS. 3A-3C, blades are illustrated that may be attached to wire 201 in a process for fashioning fishing tackle (such as a lure) according to embodiments of the present invention. Specifically, three possible embodiments (FIGS. 3A-3C) of blade are shown, including a single apex blade, are illustrated.

Figure 4A:
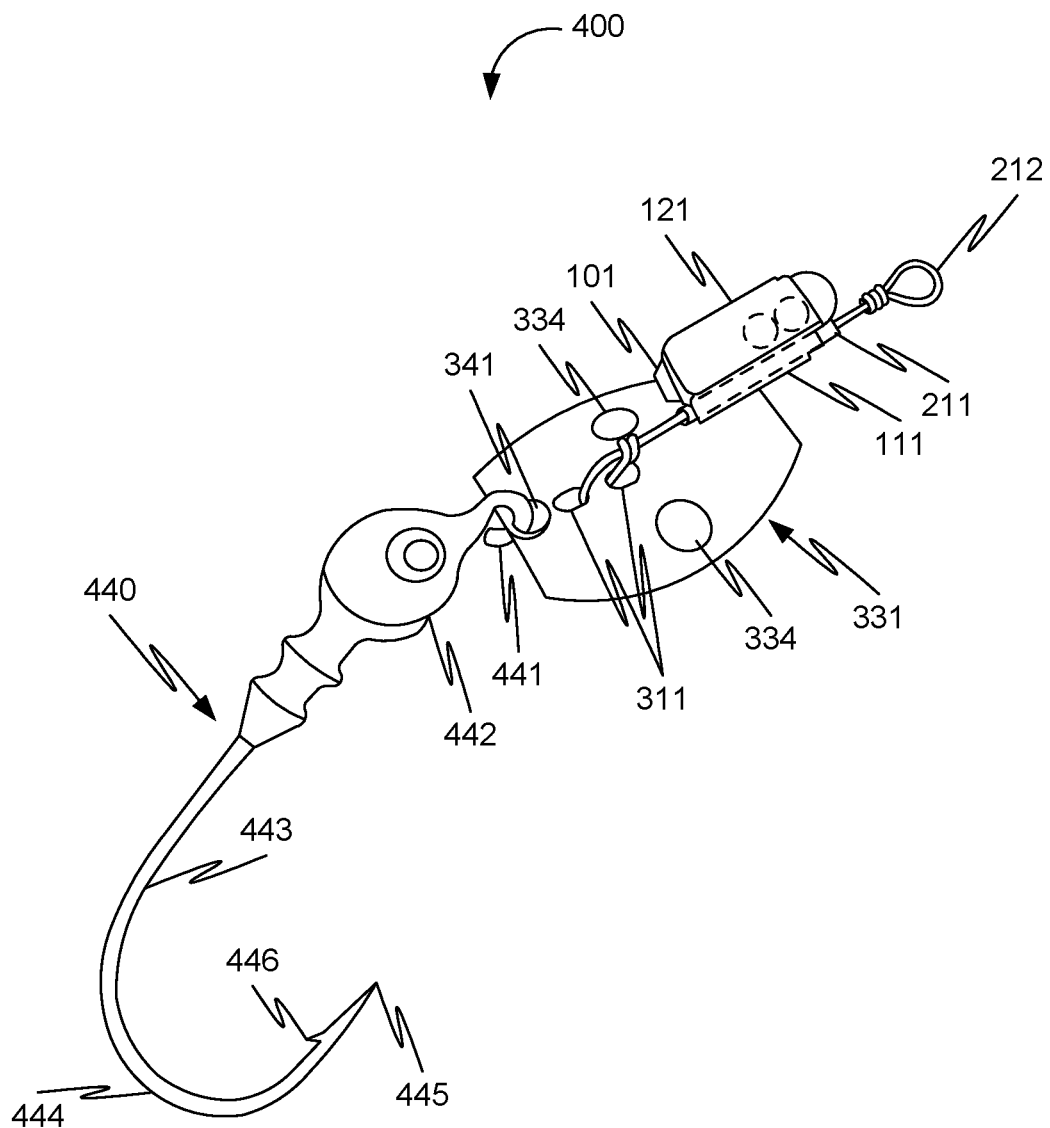
FIG. 4 illustrates Diamondback Rattler tackle with a hook.

Referring now to FIG. 3A, blade 331 is an initially flat piece of metal (which may be any of shiny, colored, or blackened metal) with a plurality of holes 311A, 311B, 334, and 341 (though not all embodiments require all holes) cut through the blade 331. Blade 331 may be spade-shaped (that may be formed into a shape with one or more apexes), or a shallow dome shape. Ends 313-314 may be straight (as illustrated) or angular or arcuate. In some embodiments, blade 331 includes multiple blade wire holes 311A 311B, through which wire 201 may be passed. In exemplary embodiments, blade 331 includes two blade wire holes 311A 311B. The wire 201 may be passed through a first blade wire hole 311A, bent (or otherwise formed), and passed back through a second wire hole 311B. Wire 201 may then be wrapped around itself forming an eye, to secure the wire 201 to the blade 331 (the eye is illustrated in FIG. 4A as item 409).

In some embodiments, one or more blade wire holes 311A 311B may be located approximately along a central axis of flat blade 331 (or proximate to the geometric center of flat blade 331); generally, it is preferred that a second blade wire hole 311B be located proximate to a first blade wire hole 311A. Blade hook hole 341 may be located proximate to an edge 313 of blade 331, and in some embodiments may be positioned along a central axis of blade 331.

In another aspect, in some embodiments, blade 331 may further include one or more blade hydrodynamic holes 334. In some such embodiments, the blade hydrodynamic holes 334 may be roughly circular or ovular and have diameters larger than those of the blade wire holes 311A 311B and/or the blade hook hole 341. The blade hydrodynamic holes 334 may be sized to reduce drag as the blade 334 traverses through water. The blade hydrodynamic holes 334 may also be sized to create additional noise similar to the noise produced by marine life as the blade is moved through the water.

Referring now to FIG. 3B, in some embodiments, blade 331 may be formed to include one or more apex portions along a length of the blade 331. The apex may be angular or a dome shape of varying curvatures and be formed via an axial blade bend 333, wherein an axial blade bend 333 refers to a bend along an axis of the blade 331, such as the axis defined by a line between the blade hook hole 341 and a point of the blade 331. The axial bend may form an apex on a convex side of the blade and a hollow on a concave side of the blade, wherein the convex side of the blade and the concave side of the blade comprise sufficient area and slope the cause movement in the blade as the blade is moved through water.

Embodiments of the present invention include variations of an axial blade bend 333 that result in forming a blade 331 with an apex angle, an apex curve, or dome shape. In some embodiments, an axial blade bend 333 is offset laterally from the axis of the blade 331. In some embodiments, such as the one demonstrated in FIG. 3C, the blade 334 may have a plurality of offset axial blade bends 333. It may be desirable in some such embodiments to create the offset axial blade bends 333 in a symmetrical fashion relative to the axis; for example, as shown in FIG. 3C. The distance from the axis to each offset axial blade bend 333 is preferably approximately equal, although other variations are within the scope of the invention. An offset axial blade bend 333 may reduce lift of the blade 334 as the blade passes through water.

Some embodiments may include forming a transverse blade bend 332 by forming an end 314 of the blade 331 at an angle to a plane of blade 331. This creates a bend perpendicular to the axis of the blade 331 and the bend defines a lift surface 308 along a second flat side of the plate. The lift surface 308 is preferably of sufficient area to impart lift effects or diving effects as the blade passes through water. The upward or downward effect will depend upon an upward or downward formation of the lift surface 308.

Referring now to FIG. 4A, Diamondback Rattler tackle with hook 400 is shown. As discussed above, the Diamondback Rattler tackle with hook 400 comprises the molded slide 102 and audible generator 101 (as combined using the heat-shrink tubing 103), with the wire 201 passed through the slide 102 and movably attached to the blade 331 by passing the wire 201 through one or more blade wire holes 311. Blade 331 is attached to the hook 401 by looping the eye 402 of the hook through the blade hook hole 304. Both the hook 401 and the wire 201 (and accordingly, the audible generator 101 attached to the wire 201) are free to pivotally move about the blade 331. The audible generator 101 may produce different audio profiles depending upon the presence or absence of folds or bends in the blade 331. For example, if the blade 331 includes a transverse blade bend 332, the audible generator 101 may strike the blade 331 at a different point and different angle than if the blade 331 lacked the transverse blade bend 332.

The hook 401 includes an eye 402, shank 403, bend 404, and point 405. In some embodiments, the eye 402 is a generally circular loop, and rests movably in the blade hook hole 304. In some embodiments, the hook 401 may further comprise a weight 407. In some embodiments, the weight may have a weight of between 0.250 ounces and 1.75 ounces. In some embodiments, the weight 407 is fixedly attached to the shank 403 of the hook 401. The shank 403 is straight, metallic, and connects the eye 402 to the bend 404. The part of the bend 404 closest to the eye 402 begins a transition from the straight shank 403 to the curved bend 404 of the hook 401. The point 405 is the sharp end of the hook 401, designed to pierce through fish and aquatic obstacles. In some embodiments, the hook 401 further comprises a barb 406, a projection extending backwards from the point 405, which secures the fish from unhooking.

Figure 4B:
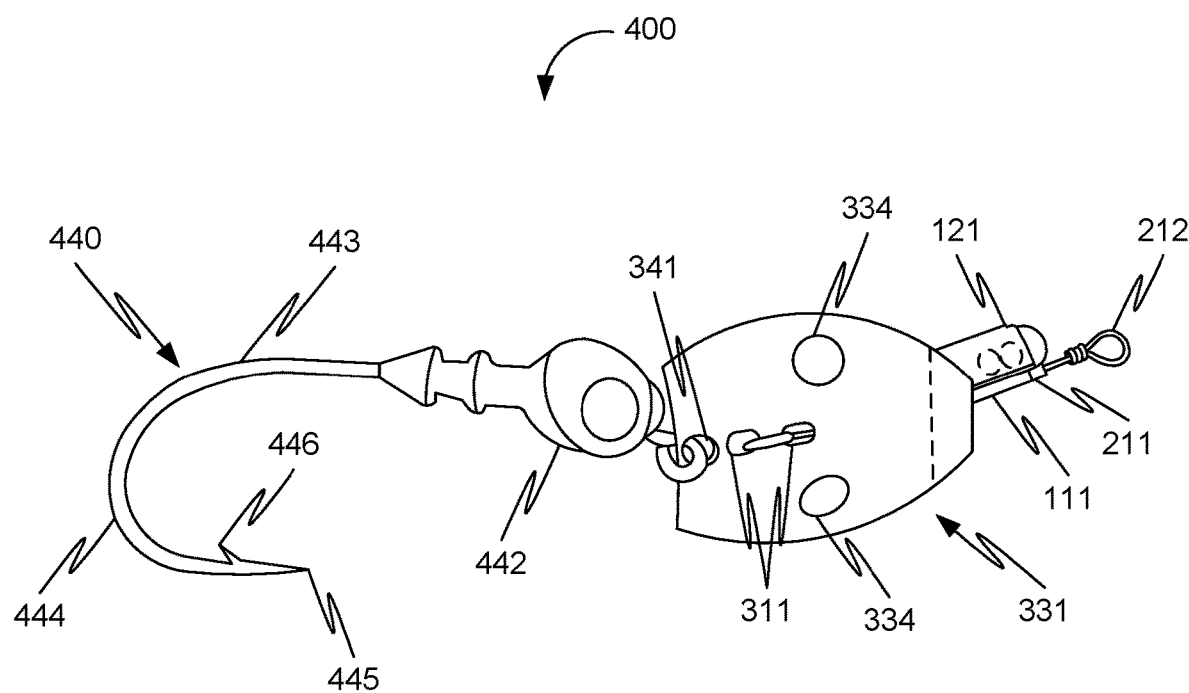

Referring now to FIG. 4B, an exemplary embodiment of the Diamondback Rattler tackle with hook 400 is shown. In this embodiment, blade 331 is a concave piece of metal having a transverse blade bend 332 in the +z direction. Wire 201 may be positioned on a convex side of the blade or a concave side of the blade according to how it is desired for the blade to interact with the movement of the blade 331. Movement of the blade may be increased by turbulence caused by the Diamondback Rattler with hook 400 as it drags through the water. When combined with weight 407, hook 401 sinks in the water, while the audible generator 101 makes noise and the Diamondback Rattler with hook 400 moves chaotically—like a small fish, as would be attractive to a larger fish—due to the hydrodynamic effects of the bended blade 331.

Referring now to FIG. 5, a method for improved use of a fishing lure is shown. At step 501, an audible noise generator is attached to a slide using thermoplastic tubing, as described above. The audible noise generator may include a rattle. The audible generator may also be attached to the wire by heat shrink or other means suitable for deployment in a marine environment. The slide may comprise a thin tube through which a wire may be threaded. At step 502, the wire is threaded through the slide. At step 503, the wire is then attached to the blade through one or more holes on a surface of the blade.

At optional step 504, the blade may be bent according to one or more parameters discussed herein. These parameters may include the type of aquatic environment in which the lure is to be deployed or the type of marine life to be caught. In some embodiments, the blade may have one or more bends to generate a particular hydrodynamic profile of the Diamondback Rattler tackle and hook's movement through water. Step 504 includes bending the blade along the axis of the blade to form a convex side of the blade and a concave side of the blasé. Step 504 also includes bending the blade along a transverse line to an axis of the blade. In some exemplary embodiments, the blade may have two symmetrical axial concave bends in a +z direction and a transverse bend in a −z direction. At step 505, the hook is attached to a blade. The hook may be attached to the blade by a wire, or any other attachment means suitable for deployment in a marine environment. In some embodiments, the hook comprises a weight, which weight has between 0.250 and 1.75 ounces.

Figure 6:
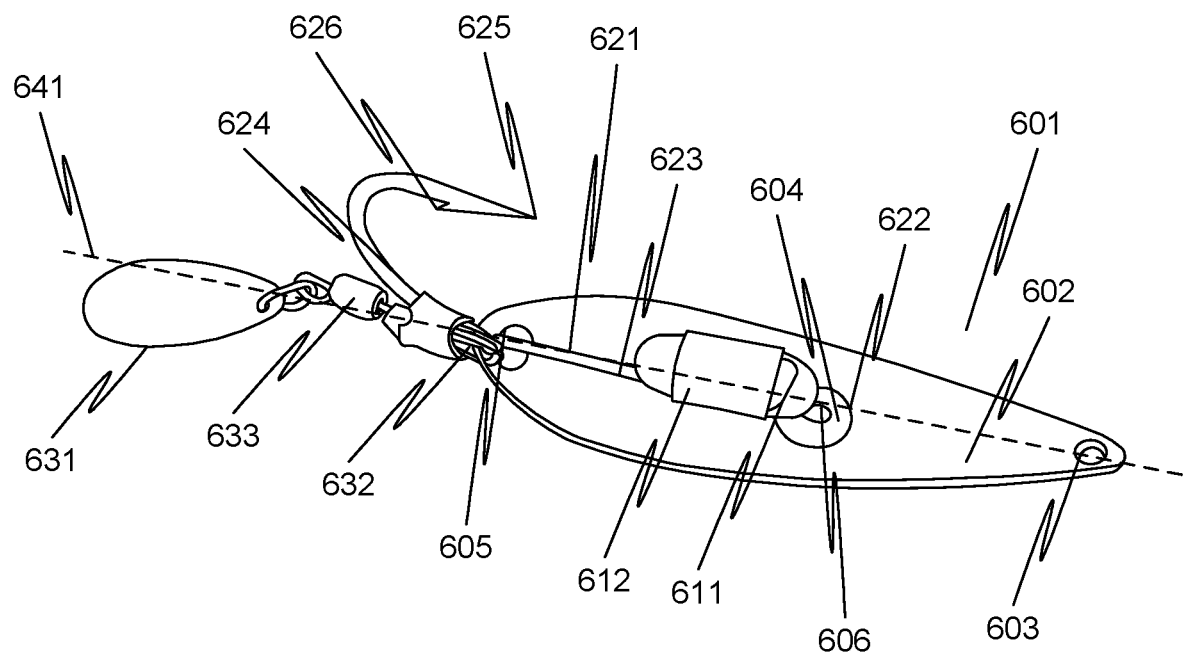
FIG. 6 illustrates an exemplary embodiment of the Audible Enhanced Fishing Lure.

Referring now to FIG. 6, an exemplary embodiment of the Audible Enhanced Fishing Lure 601 is shown. The Audible Enhanced Fishing Lure broadly comprises interrelated aspects, including: a visual attraction portion, such as a spoon 602; an audible generator 611; a hook 621; and in some embodiments, a secondary visual attraction portion, such as a blade 631. The respective aspects will be of a relative size and weight suitable for arrangement according to the concepts presented herein. The hook 621 rests generally near the geometrical center of the spoon 602, and forms a central radial axis for the Audible Enhanced Fishing Lure 601 along the hook axis 641.

As used herein, an audible generator 611 is a device that produces a sound wave that is ascertainable by a fish. An audible generator may include, by way of non-limiting example, one or more of: a mechanical rattle, beads within a casing with enough area within the casing to strike one or both of other beads and the casing, beads that are axially strung and may strike each other, or a strike plate, a piezoelectric device, and an electric sound device.

The spoon 602 is formed of a rigid or semi rigid material and preferable includes a surface capable of reflecting light, such as a highly reflective metal. The surface may be a smooth mirrored surface or a textured surface, such as concave divots. Preferably the spoon comprises a concave side that in some embodiments focuses light, and a convex side that generally scatters light. The spoon 602 further comprises a proximal hole 603, for connection to a fishing rod or similar device, and a distal hole 605. In exemplary embodiments, the spoon 602 also has a central hole 606. The central hole 606 is generally at or near the x- and y-axis center of the spoon 602.

In exemplary embodiments, the spoon 602 comprises an eye rivet 604 situated generally near the geometrical center of the spoon 602, and in some embodiments, the rivet 604 encompasses the central hole 606. The rivet 604 is made of a highly reflective metal that is generally the same or near the same color as the spoon, and in some embodiments is the same metal as the composition of the spoon 602.

The Audible Enhanced Fishing Lure 601 further comprises an audible generator 613, which is fixably attached to the concave side of the spoon 602 and situated generally near the geometrical center of the spoon. In some embodiments, an audible generator 611 includes a casing including a cylindrical casing 611 and one or more strikers 612 within the casing 611. The cylindrical casing 611 is closed at both ends 614, and encloses at least one striker 612 comprising a moveable insert, such as metallic ball bearing. The at least one striker 612 is roughly spherical, and has a diameter slightly smaller than the base diameter of the casing comprising a cylindrical casing 611. The at least one striker 612 can move freely within the tube to create a rattling sound when it impacts a closed end of the cylindrical casing 611 or another striker 612 such as another metallic ball bearing. The radial axis of the tube is approximately aligned with the hook axis 641 of the spoon.

Figure 7:
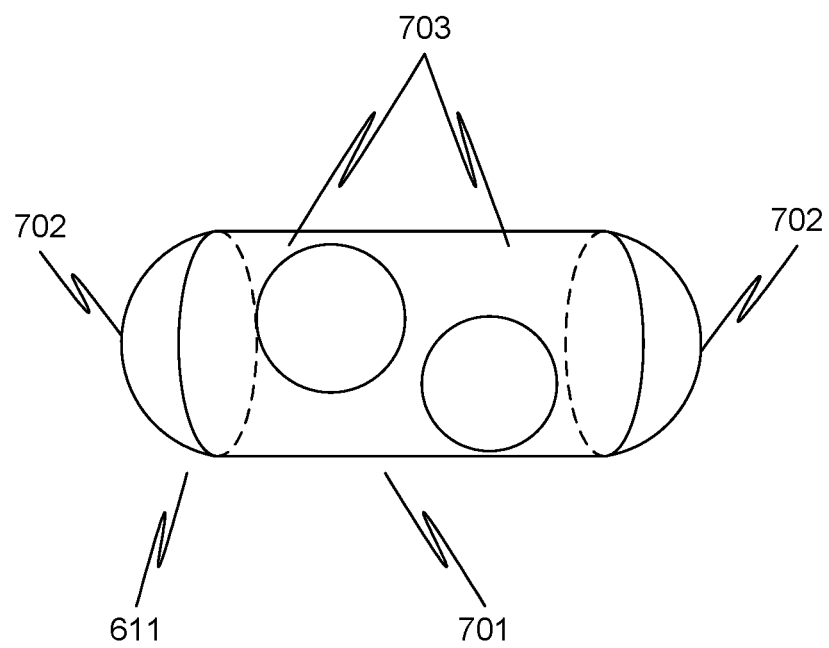
FIG. 7 illustrates an exemplary embodiment of the rattle fixably attached to the spoon lure.
Figure 9A:
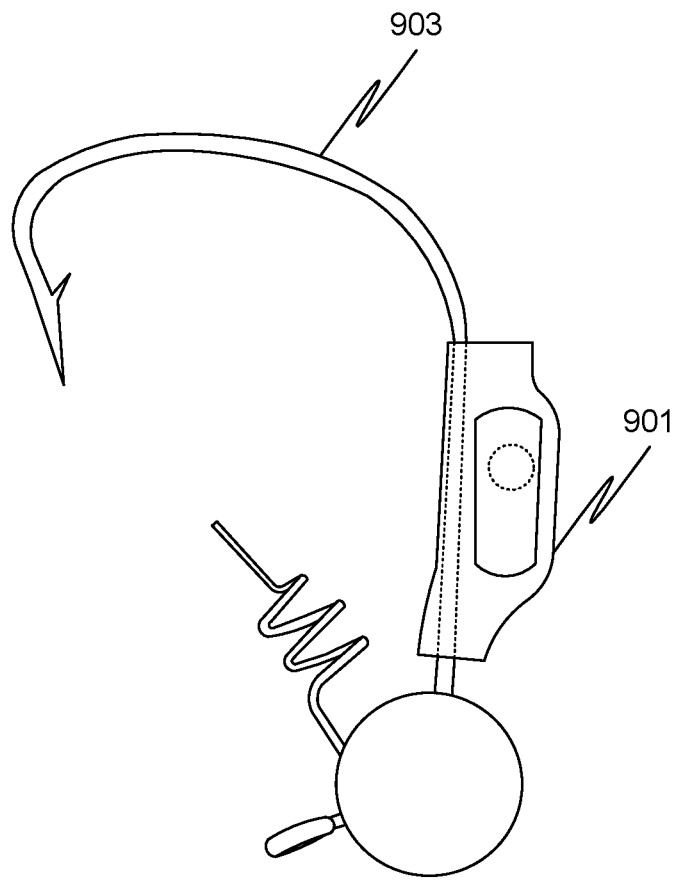
FIGS. 9A-9F illustrate various views and alternative embodiments of an Audible Enhanced Fishing Lure.
Figure 9B:
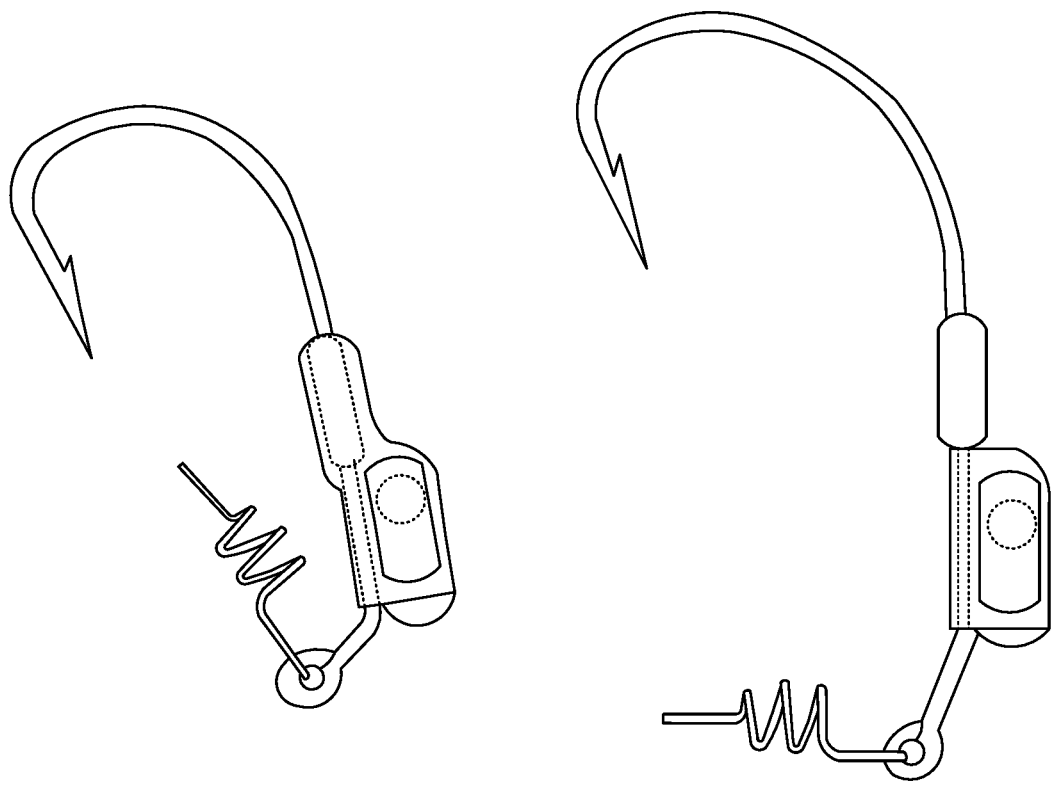
Figure 9C:
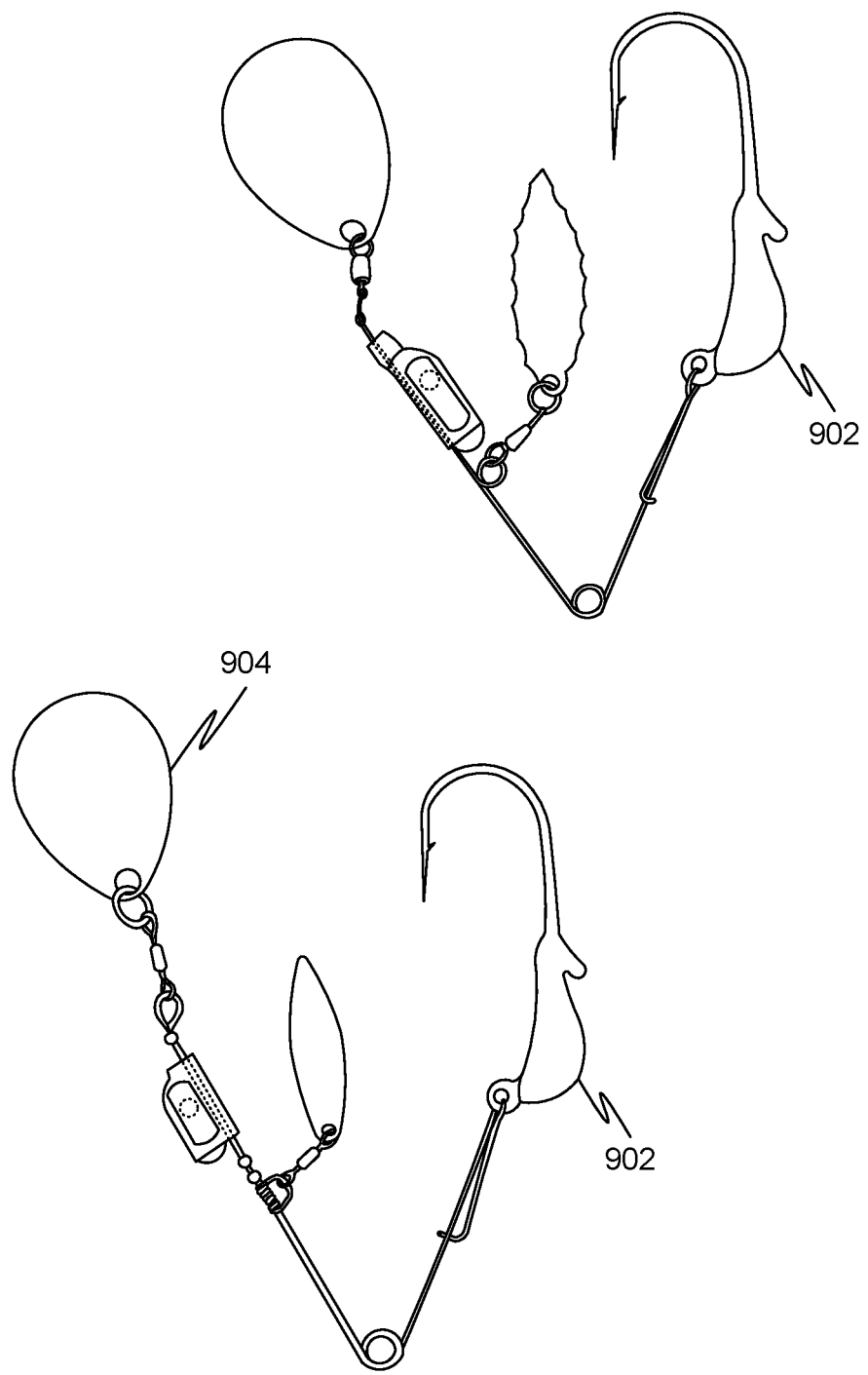
Figure 9D:
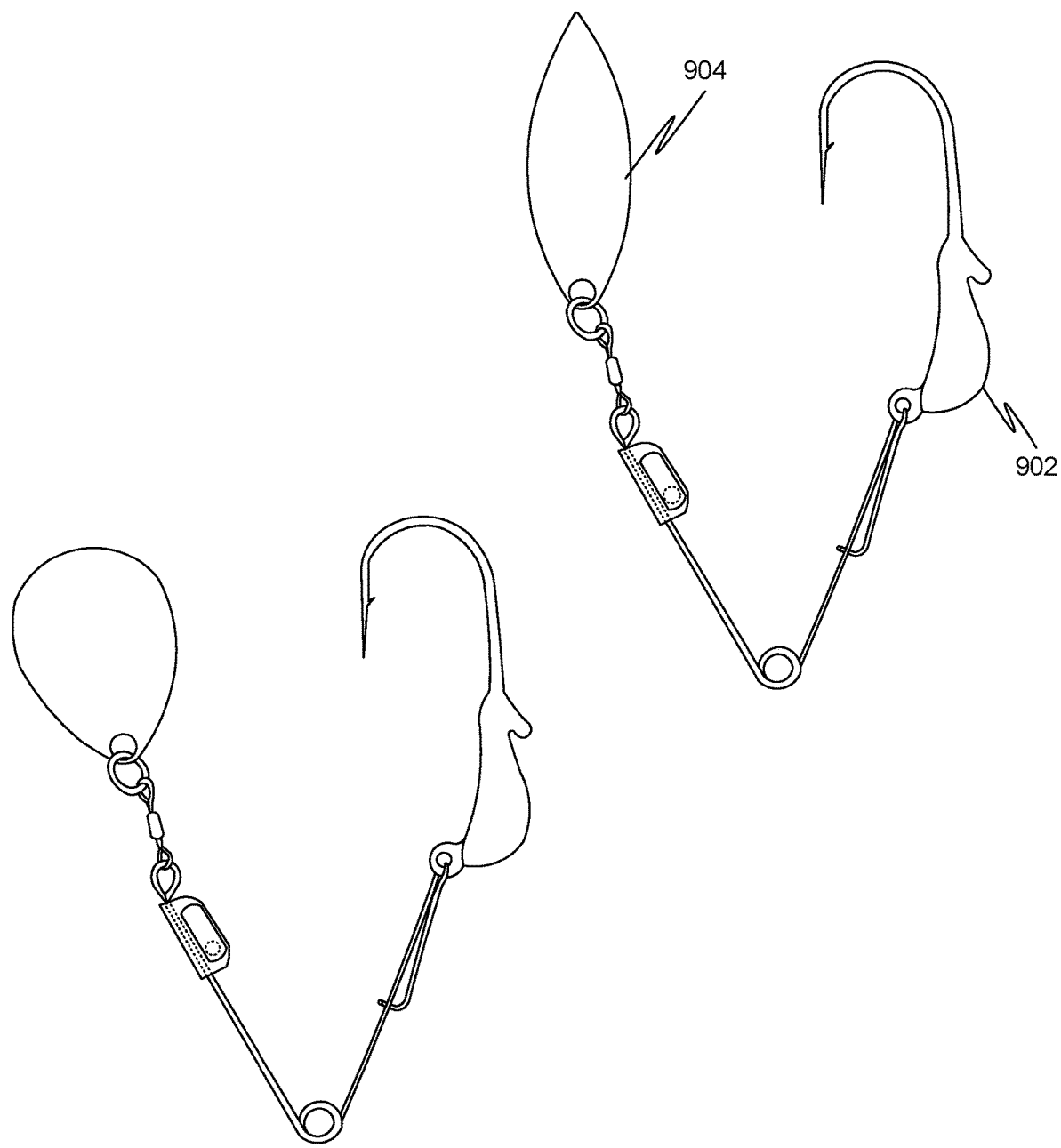
Figure 9E:
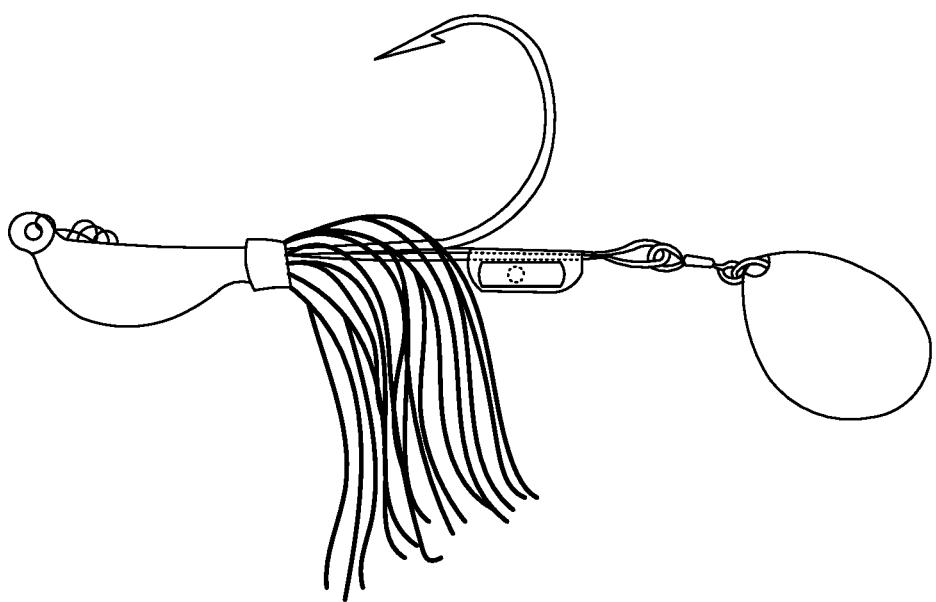
Figure 9F:
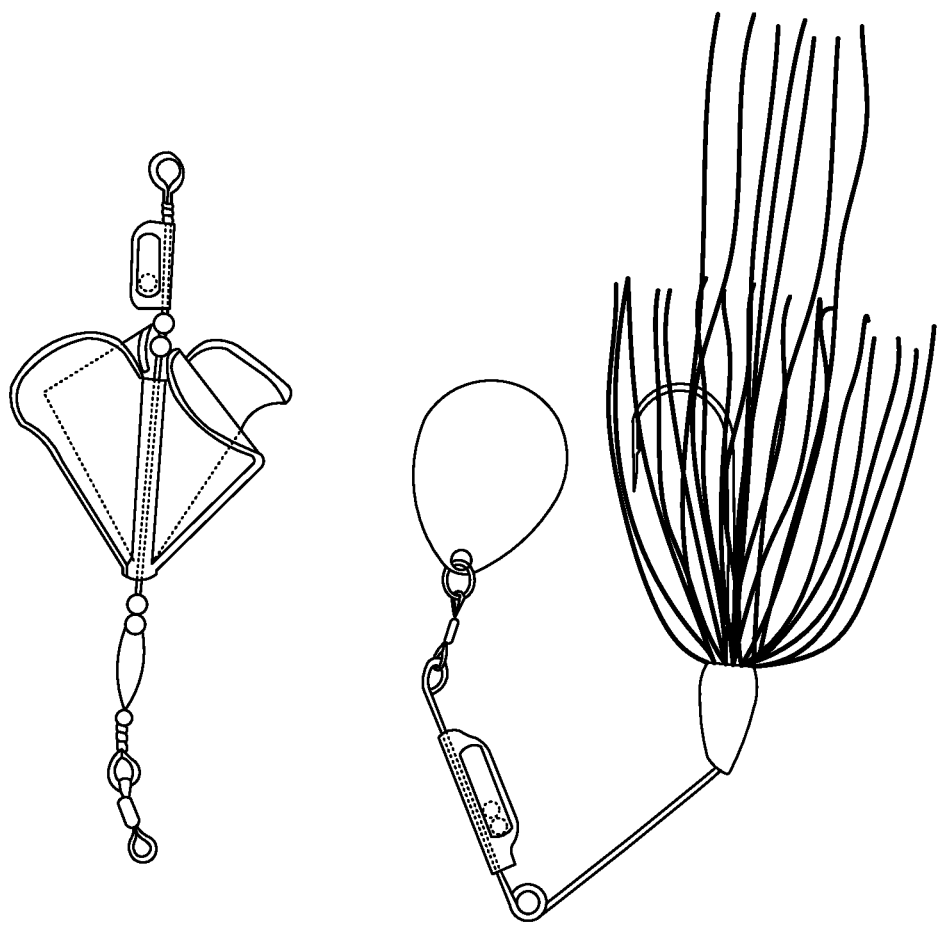

Referring now to FIG. 7, in some embodiments, an audible generator 613 comprises a hollow shell of a bullet-shaped external contour with an integral cylindrical tube 701 extending therethrough. In some embodiments, one end of the cylindrical tube rests on the rivet 604. The cylindrical tube is closed at both ends 702, and encloses at least one moveable insert, such as metallic ball bearing 703. The at least one metallic ball bearing 703 is roughly spherical, and has a diameter slightly smaller than the base diameter of the cylindrical tube 701. The at least one metallic ball bearing 703 can move freely within the tube to create a rattling sound when it impacts a closed end of the cylindrical tube 702 or another metallic ball bearing 703. The radial axis of the tube is approximately aligned with the hook axis 641 of the spoon.

Referring again to FIG. 6, the Audible Enhanced Fishing Lure 601 further comprises a hook 621. The hook 621 includes an eye 622, shank 623, bend 624, and point 625. In some embodiments, the eye 622 is a generally circular loop, and rests fixably between the rivet 604 and the central hole 606, to allow a device like a fishing line to pass easily through the central hole 606, rivet 604, and eye 622. The shank 623 may be straight and metallic and may connect the eye 622 to the bend 624. The shank 623 may pass through the axis of symmetry of the spoon 602 to define the hook axis 641. The part of the bend 624 closest to the eye 622 may begin a transition from the straight shank 623 to the curved bend 624 of the hook. In some embodiments, this part of the bend 624 passes through the distal hole 605 of the spoon 602. In other embodiments, the part of the shank 623 furthest from the eye 622 passes through the distal hole 605 of the spoon 602. A person skilled in the art will understand that the hook 621 passes through the distal hole 605 of the spoon 602. The bend 624 of the hook passes in a U-shape generally along the hook axis toward the blade 631, curving upwards along the hook axis 641. While one end of the U-shape passes through the distal hole 605, the other end, on which the point 625 sits, lies parallel to the distal hole 605, near the parabolic focal point of the spoon 602. The point 625 is the sharp end of the hook 621, designed to pierce through fish and aquatic obstacles. In other embodiments, the point 625 may rest beneath the spoon 602. In some embodiments, the hook 621 further comprises a barb 626, a projection extending backwards from the point 625, which secures the fish from unhooking.

The audible generator 611 may be fixedly attached to the hook 621 on the shank 623 by a first heat shrink tube 612. The first heat shrink tube 612 is generally cylindrical, and due to the thermoplastic shrinking process that binds the first heat shrink tube 612 to the hook 621 and audible generator 611, may have a base diameter approximately identical in side to the sum of the base diameter of the rattle cylindrical tube 701 and the thickness of the shank 623, which may make separation of the audible generator 611 from the hook 621 difficult. This is desirable both for fishing applications, as the sound of the audible generator 611 attracts the fish precisely to the hook 621, and for environmental purposes, as the audible generator 611 is generally small and poses a choking hazard to wildlife. Additionally, as described earlier, the composition of the heat shrink tube 612 may be water resistant, thus slowing any degradation of the binding between the hook 621 and the audible generator 611. In some embodiments, the first heat shrink tube 612 has a similar color to that of the spoon 602.

In some embodiments, the Audible Enhanced Fishing Lure further comprises a blade 631. The blade 631 may be highly reflective, and in some embodiments, is made of the same metal as the spoon 602. The blade 631 may be movably attached to the spoon 602 by a swivel 632. In some embodiments, the swivel comprises a connector attached to the blade 631 and clasped through the distal hole 605 of the spoon 602. The blade 631 can freely move about the hook axis 641. The swivel 632 is bound fixably to the bend 624 of the hook 621 by a second heat shrink tube 633. The second heat shrink tube is generally composed of the same matter as the first heat shrink tube 612, and is shrunk to snugly bind the bend 624 and the swivel 632.

Referring now to FIG. 8, exemplary steps that may be used for assembling an Audible Enhanced Fishing Lure according to the present invention are illustrated. At step 800, a hook of appropriate size ratio to a lure spoon is positioned on the lure spoon. The spoon will include a hole at the proximate end of the spoon, a hole at a mid-portion of the spoon and a hole at a distal end of the spoon. An appropriate size ratio may include, for example, a hook of between about 50% of the length of the spoon to about 200% of the length of the spoon. At 801, an attachment loop on the hook is fixedly attached to the hole at the mid-portion of the spoon. Attachment may be accomplished for example via a rivet, a bolt, a weld, solder or other mechanical attachment.

At step 802, a proximate end of a swivel is attached to the hope at the distal end of the spoon. At step 803, a rattle assembly is fixedly attached to the shank of the hook. In some preferable embodiments, the rattle is attached to the shank of the hook proximate to the hole at the mid-portion of the spoon via shrink tubing encircling the rattle and the shank of the hook. In some embodiments, an adhesive and/or sealant may be used in addition to the shrink tubing to fixedly attach the rattle to the shank of the hook.

At step 804, the shank of the hook is attached to the swivel via shrink tubing. An adhesive and/or sealant may also be used to supplement the binding capability of the shrink tubing holding the shank of the hook to the swivel.

At step 805, in some embodiments, a blade may be attached to a distal end of the swivel. In preferred embodiments, the blade is positioned to move proximate to a point at the end of the hook. The blade acts as a visual attraction for a game fish to the point of the hook.

Referring now to FIGS. 9A-9F, various embodiments of the present invention are illustrated. As illustrated, an audible generator 901 may be placed in various positions in relation to a weighted portion 902, a hook 903, a spoon 904 or other aspect of fishing tackle.

Weighted Popping Flotation Device

Figure 10:
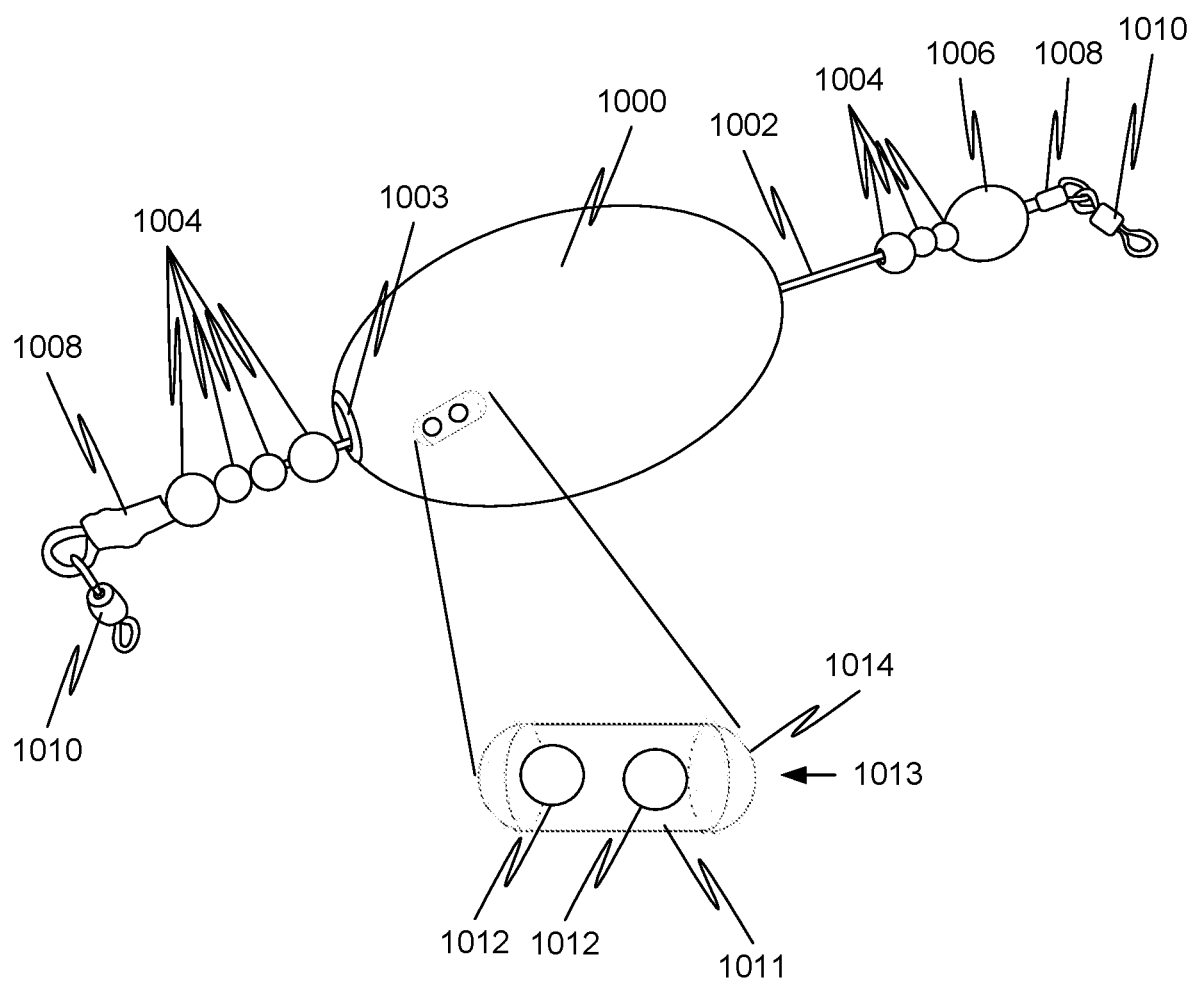
FIG. 10 illustrates an exemplary embodiment of a weighted popping floatation device.

Referring now to FIG. 10, an exemplary embodiment of the weighted popping flotation device is shown. The weighted popping flotation device broadly comprises a cork 1000, popping line 1002, and a one or more audible generators 1004 and 1006. Audible generators 1004, 1006, 1013 may include a casing 1011 for generating a resonant sound when percussed by a striker 1012. The casing 1011 will contain the striker within a confined area sufficient to allow movement of the striker 1012 within the casing. A striker 1012 may include, by way of non-limiting example: a bead, a spheroid, a cylinder and/or a weighted end of a tensile spring. Movement of the audible generator 1004, 1006 causes the striker 1012 to move against the casing 1011 and create a sound wave. Aspects of one or more of: the size of the casing 1011; the shape of the casing, the material of the casing 1011, the thickness of casing 1011 walls, variations in thickness of casing 1011 walls; striker 1012 size; striker 1012 shape; striker 1012 material; hardness (or elasticity) of the striker 1012 and/or the casing 1011; area of movement of the striker 1012 within the casing 1011 or other variable capable of changing one or both of volume and tonality of a sound generated by the striker 1012 coming into contact with or moving against the casing 1011.

In some embodiments, an audible generator 1013 may be chosen according to expected preferences of a targeted fish for which the popping cork will be deployed. For example, a larger fish may be more attracted to a deeper tonality and a slower rhythm of sound to be generated; a smaller fish may be attracted to a higher pitch tonality and a faster rhythm of sound.

As used herein, an audible generator 1013 is a device that produces a sound wave that is ascertainable by a fish. An audible generator may include, by way of non-limiting example, one or more of: a mechanical rattle, beads within a casing with enough area within the casing to strike one or both of other beads and the casing, beads that are axially strung and may strike each other, or a strike plate, a piezoelectric device, and an electric sound device.

In some embodiments, an audible generator includes a casing including a cylindrical casing 1011 and one or more strikers 1012 within the casing 1011. The cylindrical casing 1011 is closed at both ends 1014, and encloses at least one striker 1012 comprising a moveable insert, such as metallic ball bearing. The at least one striker 1012 is roughly spherical, and has a diameter slightly smaller than the base diameter of the casing comprising a cylindrical casing 1011. The at least one striker 1012 can move freely within the tube to create a rattling sound when it impacts a closed end of the cylindrical casing 1011 or another striker 1012 such as another metallic ball bearing. The radial axis of the tube is approximately aligned with the hook axis 1041 of the spoon. The radial axis of the tube is approximately aligned with the axis of the line 1002.

The cork 1000 may include a hard shell with a hollowed cylindrical-shaped area extending therethrough. This is desirable because the hard shell creates an acoustic chamber for an audible generator therein. In some embodiments, the cork 1000 is made from Styrofoam. In other embodiments, the cork 1000 is made from plastic. The cork 500 additionally comprises two eye rivets 1003 on each end of the hollow cylinder. The eye rivets may be made of at least one of: steel, brass, metal, aluminum, or plastic.

A metal wire 1002 passes through the cork 1000 through the eye rivets 1003 and forms an axis for the weighted popping flotation device. The cork 1000 can move freely along the wire 1002. Adjacent to the cork 1000 on both axial sides thereof are a plurality of audible generators 1004. In the embodiment shown in FIG. 6, the plurality of audible generators 1004 comprise metallic ball bearings of non-uniform size. At least one audible generator on each side of the cork 1000 can move freely along the wire 1002. In some embodiments, it may be desirable to include an audible generator 1006 that is significantly different from the audible generators 1004 in size and weight, to generate different acoustic profiles. In a preferred embodiment, audible generator 1006 comprises a lead weight, coated to prevent lead dust in a fisherman's tackle box. In a preferred embodiment, the audible generators 1006 and 1008 are chosen to ensure the entire weighted popping flotation device apparatus weighs between approximately 0.72 and 0.73 ounces.

On at least one axial end of the metal rod 1002, is fixably attached a swivel 1010. In some embodiments, the swivel 1010 may be attached by heat shrink tubing 1008. Heat shrink tubing 1008 is desirable for its resistance to water and to avoid any snags on fishing line when setting the line.

Figure 11:
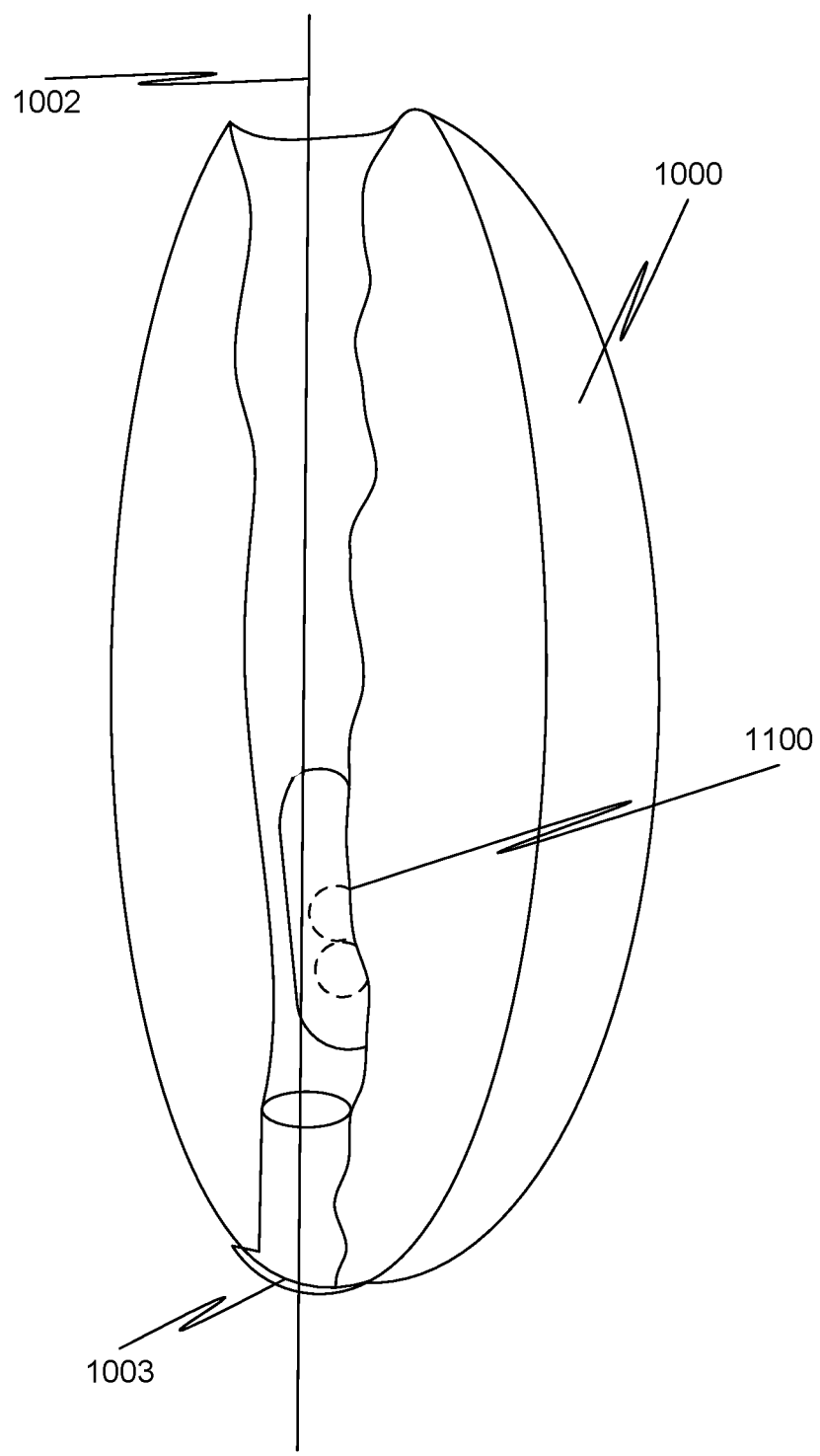
FIG. 11 illustrates an exemplary embodiment of a cross-section of a weighted popping flotation device.

Referring now to FIG. 11, a cross-section of the weighted popping flotation device 1000 is shown with one eye rivet 1003. Additionally, within the cylindrical hollowed-out area of the cork 1000 an audible generator 1100 is fixedly attached. In some embodiments, an audible generator 1100 comprises a plurality of metallic ball bearings having a radius less than the radius of the hollowed-out area of the cork 1000. In some embodiments, the ball bearings are contained within a cylindrical tube, creating a rattle, which rattle can in some embodiments move freely throughout the hollowed-out area of the cork 1000. In such embodiments, the ball bearings generate noise through colliding with each other and with each end of the cylindrical tube. Because the cylindrical hollowed-out area of the cork 1000 is bounded on each axial end by an eye rivet 1003, in some embodiments the audible generator 1100 can also generate noise by colliding with the eye rivet 1003.

In other embodiments, the audible generator 1100 is attached adhesively to the interior of the cork 1000 and cannot move throughout. In some such embodiments, it may be desirable to attach the rattle in a central location within the cork. In other such embodiments, it may be desirable to adhesively attach the rattle closer to one eye 1003 of the cork. In these embodiments, it is preferred to include as an audible generator 1004 a different colored audible generator on one side of the wire 1002, to aid the user in determining which on which side of the cork the audible generator 1100 is attached.

Additional embodiments include a weighted popping flotation device with a scaled audible generator fixedly attached to one or both of a weighted portion and within a flotation portion.

Figure 12:
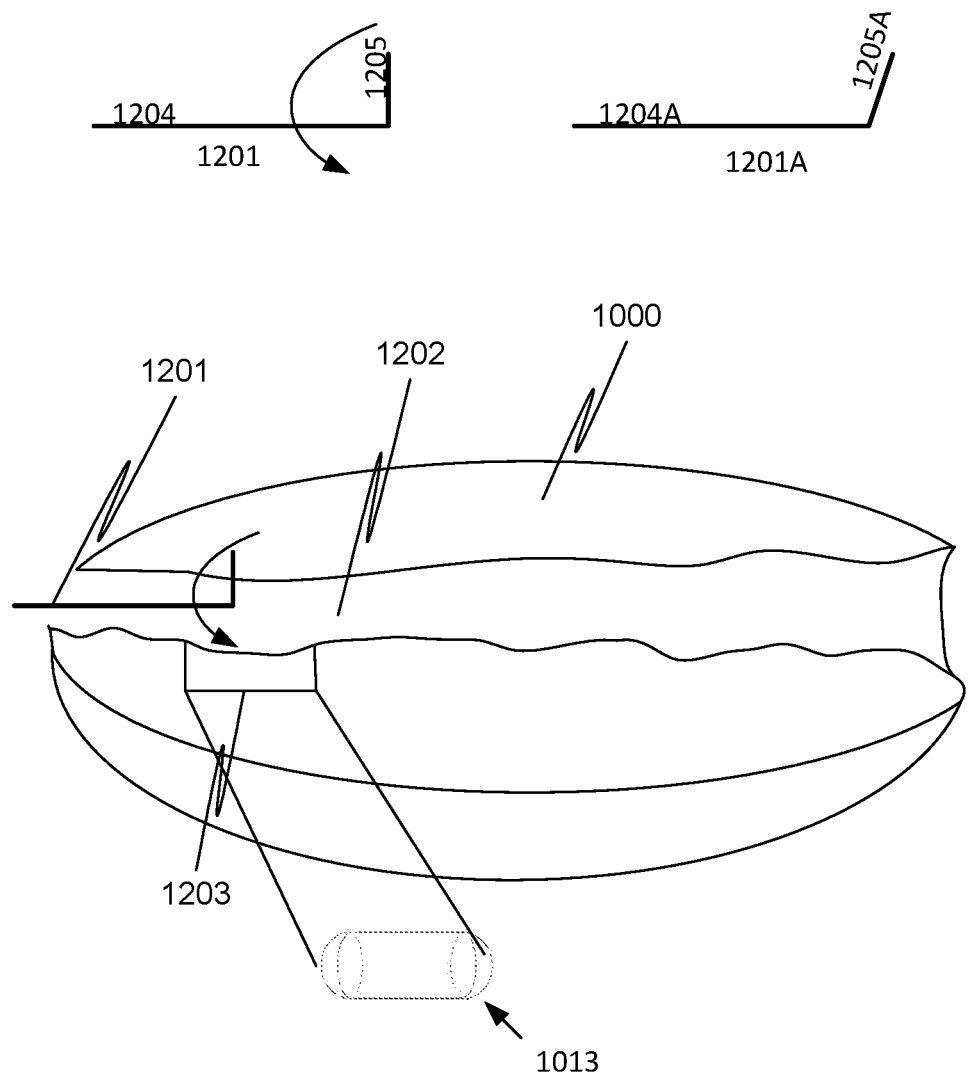
FIG. 12 illustrates an exemplary embodiment of a manufacture tool and cross-section of a weighted popping flotation device.

Referring now to FIG. 12, variations of tooling 1201-1201A useful for forming a cavity into a sidewall of a through via in a flotation material used to form a weighted popping flotation device is shown. The tooling 1201-1201A may include a first shaft 1204-1204A fixedly attached to, or formed into a single constituent with a second shaft 1205-1205A. The first shaft 1204-1204A is at an offset angle to the second shaft 1205-1205A. The angle may be a ninety (90) degree angle (such as illustrated at 1201) or another angle, such as sixty (60) degrees or forty-five (45) degrees (such as illustrated in at 1201A). As the tooling is inserted into a through via in the flotation material, rotation of the tooling may be used to remove some of the flotation material to form a cavity into which an audible generator may be placed. In some preferred embodiments, the rotation may be accomplished via a Dremel®, a drill or other motorized rotation tool.

Figure 13:
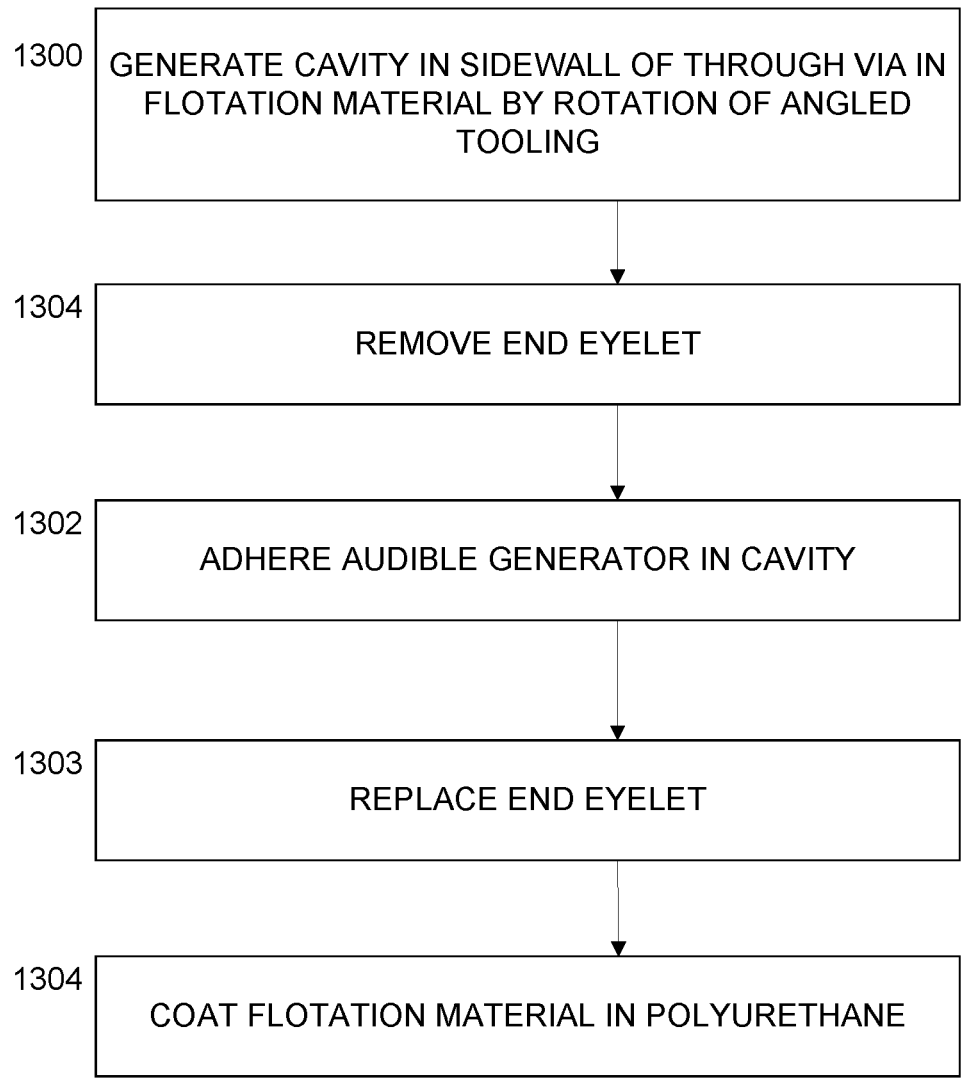
FIG. 13 illustrates an exemplary method for manufacturing a weighted popping flotation device.

Referring now to FIG. 13, a flowchart of exemplary method steps that may be used in constructing an audible flotation device 1000 is shown. At 1300, a hole is drilled into the cork 1000 with a wire bit. In some embodiments, tooling, such as a wire bit with an angled shape, is rotated to generate a cavity into a sidewall of a through via in floatation material. In some embodiments, an axial hole may also be widened or created with the tooling. A cavity of suitable size and shape for holding an audible generator 1100 may be created in a sidewall of the through via. At 1301, if an eyelet is included in an end of the through via, the eyelet may be removed. At 1302, the audible generator may be adhered into the cavity. Adherence may be accomplished via an adhesive, such as an epoxy, a thermal adhesive, a light activated adhesive, a silicone adhesive, caulking and the like.

At 1303, a removed eyelet may be replaced, and at 1304 a floatation material may be coated with a protective coating, such as, for example, by coating the flotation material with polyurethane. The coating may be applied via dipping, brushing, spraying and the like.

The flotation device 1000 may be dipped into polyurethane in the flotation device's entirety, or piecewise. In a non-limiting example, the step described at 1304 may be achieved by dipping a first portion of the floatation device, such as about one half of the volume of the floatation device, into polyurethane, allowing the dipped half to dry, then dipping the other half into polyurethane. The polyurethane is then allowed to dry. The polyurethane coating is desirable because it helps secure the audible generator 1100 to the flotation material, secure the eyelet rivets 1003 to the floatation material, and deters fish from eating the cork 1000.

A number of embodiments of the present disclosure have been described. While this specification contains many specific implementation details, this should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. Diamondback Rattler tackle comprising:
an audible generator positioned adjacent to a generally cylindrical hollow slide;
a thermoplastic sleeve fixedly attaching the audible generator to the slide;
a wire with a first end and a second end, said wire threaded through the slide, with a first end of the wire formed into a first eye on a first end of the slide and the second end extending through the second end of the slide, said first eye of a suitable size for attaching to a fishing line;
a blade comprising plate of rigid material in a generally spade shape with a first straight side and a second straight side and two arcuate sides, a first blade wire hole and second blade wire hole through plate of rigid material, the wire is threaded through the first blade wire hole and the second blade wire hole and formed into a second eyelet movably attaching the slide to the blade; and
a hook attached to the plate via a blade hook hole formed through the rigid material of the plate.

2. The Diamondback Rattler tackle of claim 1 additionally comprising an axial bend in the blade forming an apex on a convex side of the blade and a hollow on a concave side of the blade, wherein the convex side of the blade and the concave side of the blade comprise sufficient area and slope the cause movement in the blade as the blade is moved through water.

3. The Diamondback Rattler tackle of claim 2 additionally comprising a transverse bend in the blade about perpendicular to the axial bend, said transverse bend forming a lift surface in the plate.

4. The Diamondback Rattler tackle of claim 3, wherein the blade additionally comprises two hydrodynamic holes, one hole on either side of the axial bend, each hole of sufficient diameter to effect movement of the blade as the blade moves through water.

5. The Diamondback Rattler tackle of claim 4, wherein the blade comprises a blade hook hole.

6. The Diamondback Rattler tackle of claim 5, further comprising a hook, which hook comprises an eye and is movably attached to the blade via the blade hook hole.

7. The Diamondback Rattler tackle of claim 6, wherein the hook comprises a weight comprising between about 0.250 ounces and 1.75 ounces of material.

8. The Diamondback Rattler tackle of claim 7, wherein the audible generator comprises a rattle.

9. The Diamondback Rattler tackle of claim 8, wherein the rattle comprises a glass cylinder, wherein the glass cylinder comprises a glass shell, a hollow tube with a tube diameter, and a metallic ball with a ball diameter, wherein the ball diameter is less than the tube diameter.

10. The Diamondback Rattler tackle of claim 8, wherein an axis of the wire and an axis of the blade are parallel.

11. The Diamondback Rattler tackle of claim 10 wherein the blade comprises a shiny metal.

12. A method for making Diamondback Rattler tackle, the method comprising the steps of:
positioning an audible noise generator adjacent to a slide;
placing the audible generator and the slide within a heat shrink tubing with a first diameter in an expanded state;
heating the heat shrink tubing to a temperature sufficient cause the heat shrink tubing to shrink to a second diameter;
fixedly attaching an audible noise generator to a slide via the thermoplastic tubing at the second diameter;
threading a wire through the slide; and
movably attaching the wire to a blade comprising a rigid material in a generally spade shape with a first straight side and a second straight side and two arcuate sides.

13. The method of claim 12, further comprising the step of: bending the blade along an axis of the blade.

14. The method of claim 13, further comprising the step of: bending the blade along an axis offset from a central axis of the blade.

15. The method of claim 13, wherein the blade comprises a hydrodynamic hole.

16. The method of claim 13, wherein the blade comprises a blade hook hole.

17. The method of claim 16, further comprising the step of: movably attaching a hook comprising an eye to the blade hook hole via the eye of the hook.

18. The method of claim 17, further comprising the step of: attaching a weight of between 0.250 and 1.75 ounces to the hook.

19. The method of claim 18 wherein the step of attaching a weight to the hook comprises forming lead around a shaft of the hook.

20. The method of claim 19, wherein the audible generator comprises a rattle.

* * * * *